(12) United States Patent
Huang et al.

(10) Patent No.: US 11,733,540 B2
(45) Date of Patent: Aug. 22, 2023

(54) SPACE THREE-DIMENSIONAL IMAGING APPARATUS AND METHOD

(71) Applicant: Industrial Technology Research Institute, Hsinchu (TW)

(72) Inventors: Yi-Hsiang Huang, Changhua County (TW); Kuan-Ting Chen, Yunlin County (TW); Shin-Hong Kuo, New Taipei (TW); Chien-Ju Lee, Taoyuan (TW); Hung-Pin Shih, Miaoli County (TW); Yu-Hsiang Tsai, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/037,712

(22) Filed: Sep. 30, 2020

(65) Prior Publication Data

US 2021/0096392 A1    Apr. 1, 2021

Related U.S. Application Data

(60) Provisional application No. 62/908,616, filed on Oct. 1, 2019.

(30) Foreign Application Priority Data

Sep. 10, 2020   (TW) ................................. 109131098

(51) Int. Cl.
G02B 30/54 (2020.01)
H04N 13/393 (2018.01)
(52) U.S. Cl.
CPC ........... *G02B 30/54* (2020.01); *H04N 13/393* (2018.05)
(58) Field of Classification Search
CPC ....... G02B 30/54; G02B 30/56; H04N 13/393
See application file for complete search history.

(56) References Cited

U.S. PATENT DOCUMENTS 6,639,357 B1   10/2003   Parthasarathy et al.
7,490,941 B2   2/2009    Mintz et al.
(Continued)

FOREIGN PATENT DOCUMENTS

CN    103460129    12/2013
CN    106597677    4/2017
(Continued)

OTHER PUBLICATIONS

"Office Action of China Counterpart Application", dated Apr. 12, 2022, p. 1-p. 8.

*Primary Examiner* — Nitin Patel
*Assistant Examiner* — Cory A Almeida
(74) *Attorney, Agent, or Firm* — JCIPRNET

(57) ABSTRACT

A space three-dimensional imaging apparatus and a space three-dimensional imaging method are provided. The space three-dimensional imaging apparatus includes a transparent display device, a rotation motor and a processor. The transparent display device has at least one display plane. The rotation motor is configured to drive the transparent display device to rotate along an axis. The processor is coupled to the transparent display device and the rotation motor, and configured to retrieve a three-dimensional virtual image, cut multiple cutting images adapted to be displayed at multiple locations of each display plane after a rotation from the three-dimensional virtual image, and calculate a current location of each display plane during the rotation according to the driving of the rotation motor to control the transparent display device to display the cutting image corresponding to the current location on each display plane.

16 Claims, 10 Drawing Sheets

(56) References Cited

U.S. PATENT DOCUMENTS

| | | | | |
|---|---|---|---|---|
| 10,969,666 B1* | 4/2021 | Haseltine | ............. | H04N 9/3194 |
| 2004/0196362 A1* | 10/2004 | Hoshino | ................ | G03B 35/24 |
| | | | | 348/E13.028 |
| 2007/0188862 A1* | 8/2007 | Yokosawa | .............. | G02B 30/54 |
| | | | | 359/462 |
| 2013/0050184 A1* | 2/2013 | Song | ...................... | G02B 30/54 |
| | | | | 345/419 |
| 2013/0100126 A1* | 4/2013 | Kim | .................... | H04N 13/393 |
| | | | | 345/419 |
| 2013/0321394 A1* | 12/2013 | Fisher | ..................... | G09G 3/06 |
| | | | | 345/419 |

FOREIGN PATENT DOCUMENTS

| | | |
|---|---|---|
| CN | 109782452 | 5/2019 |
| CN | 110119232 | 8/2019 |
| TW | 201818142 | 5/2018 |

* cited by examiner

SPACE THREE-DIMENSIONAL IMAGING APPARATUS AND METHOD

CROSS-REFERENCE TO RELATED APPLICATION

This application claims the priority benefits of U.S. provisional application No. 62/908,616, filed on Oct. 1, 2019, and Taiwan application no. 109131098, filed on Sep. 10, 2020. The entirety of each of the above-mentioned patent applications is hereby incorporated by reference herein.

TECHNICAL FIELD

The disclosure relates to display apparatus and method, and more particularly, to space three-dimensional imaging apparatus and method.

BACKGROUND

The three-dimensional imaging technology is to truly present a three-dimensional image of an object in three-dimensional space, which can bring a real three-dimensional space visual experience to viewers. Today's three-dimensional imaging technology includes a three-dimensional projection technology, a volumetric three-dimensional image display technology or the like. Among them, the three-dimensional projection technology uses a parallel projection and/or a perspective projection to project a three-dimensional image of an object on a two-dimensional plane. The volumetric three-dimensional image display technology uses a light source such as a laser to illuminate a turntable rotating at high speed, and uses the phenomenon of light scattering to display each point of a three-dimensional object in three-dimensional space to form a three-dimensional image.

However, the three-dimensional projection technology needs to set up multiple projectors and associate a configuration including position, orientation, and field of view of each projector with display planes, so as to realize the three-dimensional projection by transforming the projection. For the volumetric three-dimensional image display technology, a system integration is relatively easy to be limited since projectors with specific specifications and electromechanical mechanism designs need to be combined, and image transparency, brightness and image quality tend to be low due to the use of reflective mirror imaging design.

SUMMARY

A space three-dimensional imaging apparatus in an embodiment of the disclosure includes a transparent display device, a rotation motor and a processor. The transparent display device has at least one display plane. The rotation motor is configured to drive the transparent display device to rotate along an axis. The processor is coupled to the transparent display device and the rotation motor, and configured to retrieve a three-dimensional virtual image, cut multiple cutting images adapted to be displayed at multiple locations of each display plane after a rotation from the three-dimensional virtual image according to a configuration of the display plane and a driving of the rotation motor, and calculate a current location of each display plane during the rotation according to the driving of the rotation motor to control the transparent display device to display the cutting image corresponding to the current location on each display plane.

A space three-dimensional imaging method in an embodiment of the disclosure is adapted to a transparent display device having at least one display plane, and a space three-dimensional imaging apparatus having a rotation motor configured to drive the transparent display device to rotate along an axis and a processor. The method includes: retrieving a three-dimensional virtual image; cutting multiple cutting images adapted to be displayed at multiple locations of each display plane after a rotation from the three-dimensional virtual image according to a configuration of the display plane and a driving of the rotation motor; and calculating a current location of each display plane during the rotation according to the driving of the rotation motor to control the transparent display device to display the cutting image corresponding to the current location on each display plane.

To make the disclosure more comprehensible, several embodiments accompanied with drawings are described in detail as follows.

DETAILED DESCRIPTION

The embodiment of the disclosure provides space three-dimensional imaging apparatus and method which combine transparent display(s), a rotation motor and an image calculation technology. The method uses the rotation motor to rotate the transparent display(s) configured on one or more display planes at high speed, and synchronously controls the transparent display(s) to display instantaneous cutting images of a three-dimensional object at different angles according to a rotation position of the rotation motor so as to build up a three-dimensional image in three-dimensional space.

Figure 1:
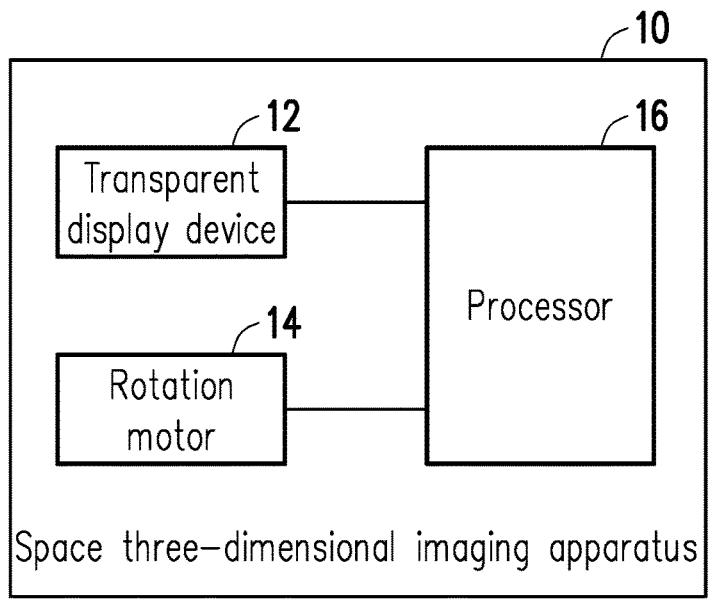
FIG. 1 is a block diagram of a space three-dimensional imaging apparatus illustrated according to an embodiment of the disclosure.

FIG. 1 is a block diagram of a space three-dimensional imaging apparatus illustrated according to an embodiment of the disclosure. Referring to FIG. 1, a space three-dimensional imaging apparatus 10 of the present embodiment includes a transparent display device 12, a rotation motor 14 and a processor 16, and functions of these devices are described as follows.

The transparent display device 12 can perform a single-sided display or a double-sided display, for example. In some embodiments, the transparent display device 12 includes, for example, at least one transparent display configured on a single display plane or a plurality of display planes. The transparent display is, for example, a transmissive transparent display such as a liquid crystal display (LCD), an organic light emitting diode (OLED) display, a micro light emitting diode (Micro LED) display, a field sequential color display, an electrowetting display), a digital light field display or the like. The transparent display device 12 has a certain degree of transparency that allows users watching the transparent display device 12 to see the background behind a three-dimensional image and feel like seeing a floating display of the three-dimensional image.

In some embodiments, the transparent display device 12 is, for example, a projection transparent display including a projector and a transparent projection screen. The transparent projection screen is made of, for example, an excitation luminous body, such as phosphors, quantum dots (Q-Dot), photoluminescence (PL) or the like, which may be excited to produce different colors of light when irradiated by light of a specific wavelength. In addition, the transparent projection screen may also be made of absorbing scattering body that can reflect and/or scatter incident light, which can scatter light to different directions when illuminated by light so that users in different directions may see a three-dimensional image projected on the transparent projection screen. For example, the transparent projection screen has the quantum efficiency (QE) greater than or equal to 75% and the transmittance greater than or equal to 50%, but not limited thereto.

For example, the rotation motor 14 is a motor capable of driving the transparent display device 12 to rotate along an axis (which may be a DC motor and an AC motor based on the nature of the voltage or a cage type and a wound rotor type based the rotor structure, and said types are not limited in the present embodiment). In some embodiments, a rotation of the rotation motor 14 is connected to a displaying of the transparent display device 12 When driving the transparent display device 12 to rotate, there is a time difference of less than 10 milliseconds between the rotating mechanism of the rotation motor 14 and the images displayed synchronously by the transparent display device 12, but not limited thereto.

The processor 16 is coupled to the transparent display device 12 and the rotation motor 14, and is, for example, a central processing unit (CPU), a microcontroller (MCU), a microprocessor, a programmable controller, an application specific integrated circuits (ASIC), a programmable logic controller (PLC) or other similar devices or a combination of these devices capable of loading in and executing computer programs to execute the space three-dimensional imaging method in the embodiment of the disclosure.

Figure 2:
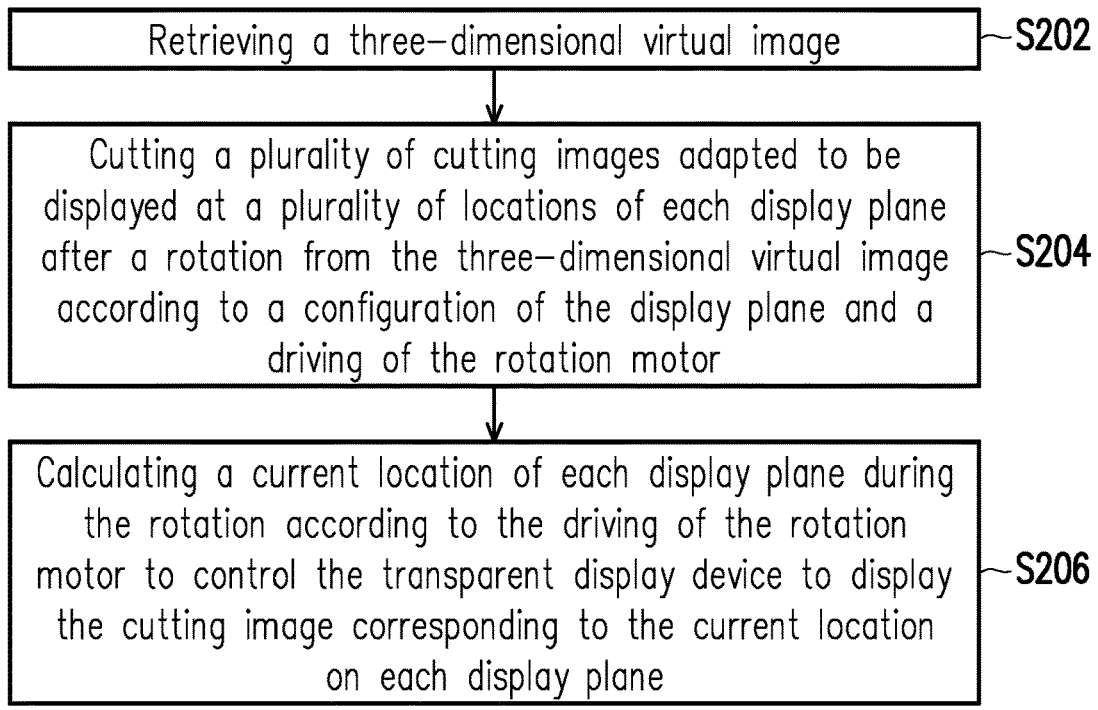
FIG. 2 is a flowchart illustrating a space three-dimensional imaging method illustrated according to an embodiment of the disclosure.

FIG. 2 is a flowchart illustrating a space three-dimensional imaging method illustrated according to an embodiment of the disclosure. Referring to FIG. 1 and FIG. 2 together, the method of the present embodiment can be applied to the space three-dimensional imaging apparatus 10 of FIG. 1. Each step in the method of the present embodiment will be described below with reference to each element in the space three-dimensional imaging apparatus 10.

In step S202, the processor 16 retrieves a three-dimensional virtual image. Here, the three-dimensional virtual image is, for example, a three-dimensional image obtained by scanning and performing a three-dimensional modeling on a target object in advance, or a three-dimensional image drawn by computer graphics. In the present embodiment, the manner in which the three-dimensional virtual image is obtained and generated is not particularly limited.

In step S204, the processor 16 cuts multiple cutting images adapted to be displayed at multiple locations of each display plane after a rotation from the three-dimensional virtual image according to a configuration of the display plane of the transparent display device 12 and a driving of the rotation motor 14.

In step S206, the processor 16 calculates a current location of each display plane during the rotation according to the driving of the rotation motor 14 to control the transparent display device 12 to display the cutting image corresponding to the calculated current location on each display plane.

In some embodiments, the transparent display device 12 is, for example, a transparent display device having a single display plane, a transparent display having two display planes facing away from each other (i.e., front and back display planes), a plurality of transparent displays respectively configured in a plurality of display regions of the same display plane or a plurality of transparent displays respectively configured on a plurality of display planes that rotate together along the axis. Type and configuration of the transparent display device are not particularly limited in the present embodiment.

Figure 3A:
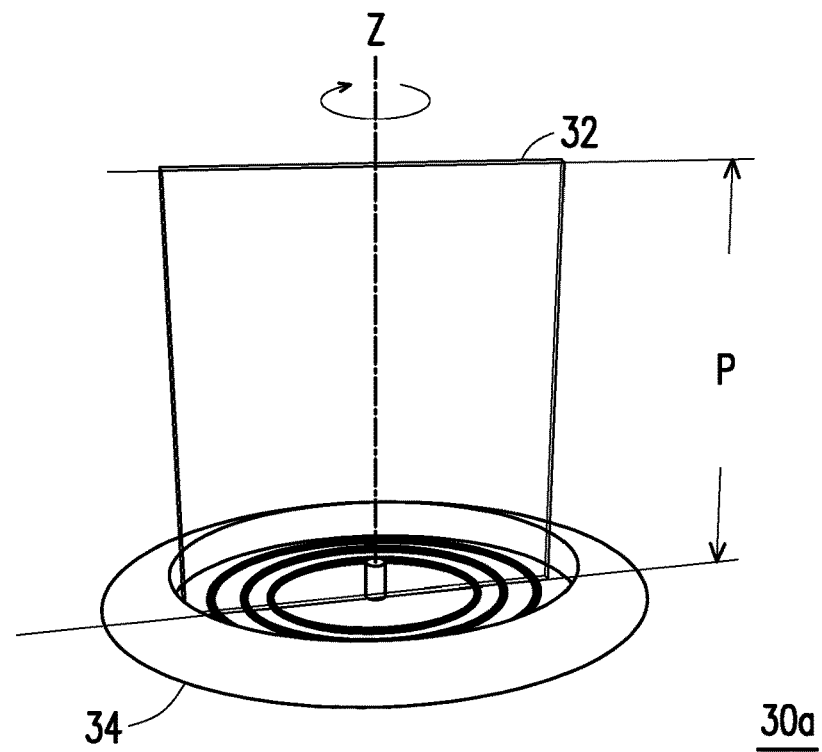
FIG. 3A and FIG. 3B are configuration diagrams of a transparent display device of a space three-dimensional imaging apparatus illustrated according to an embodiment of the disclosure.
Figure 3B:
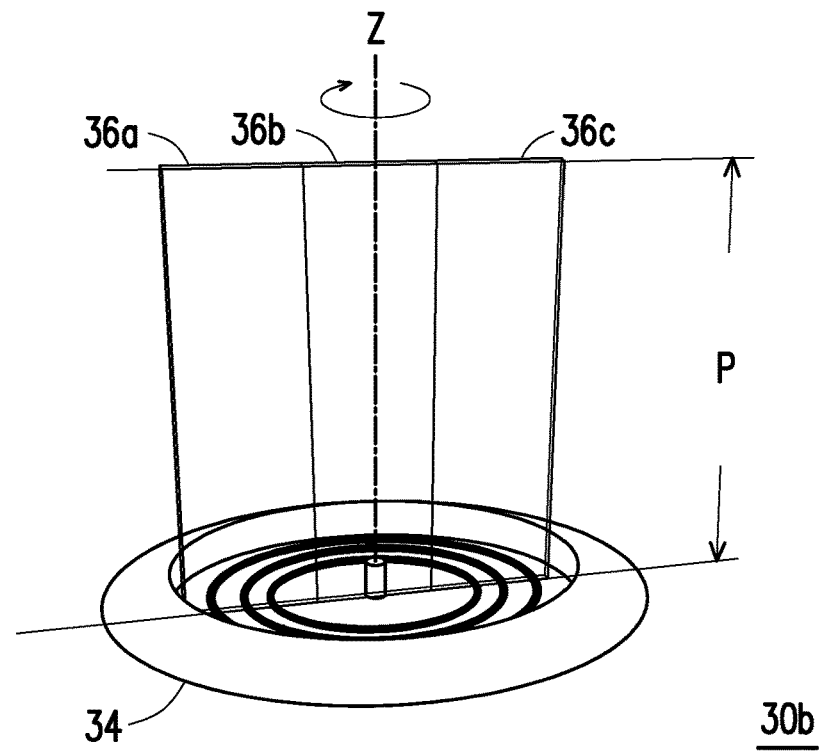

For instance, FIG. 3A and FIG. 3B are configuration diagrams of a transparent display device of a space three-dimensional imaging apparatus illustrated according to an embodiment of the disclosure. Referring to FIG. 3A, a space three-dimensional imaging apparatus 30a includes a transparent display 32 configured on a display plane P and a rotation motor 34 for driving the transparent display 32 to rotate along an axis Z. Referring to FIG. 3B, a space three-dimensional imaging apparatus 30b includes three transparent displays 36a, 36b and 36c configured in different regions on the display plane P and the rotation motor 34 for driving the transparent display device composed of the transparent displays 36a, 36b and 36c to rotate along the axis Z. Here, by using multiple transparent displays on the single display plane instead of a single transparent display to display the cutting images, the size of the transparent display may be reduced so that an image update frequency and a response speed of the display may be increased.

Figure 4A:
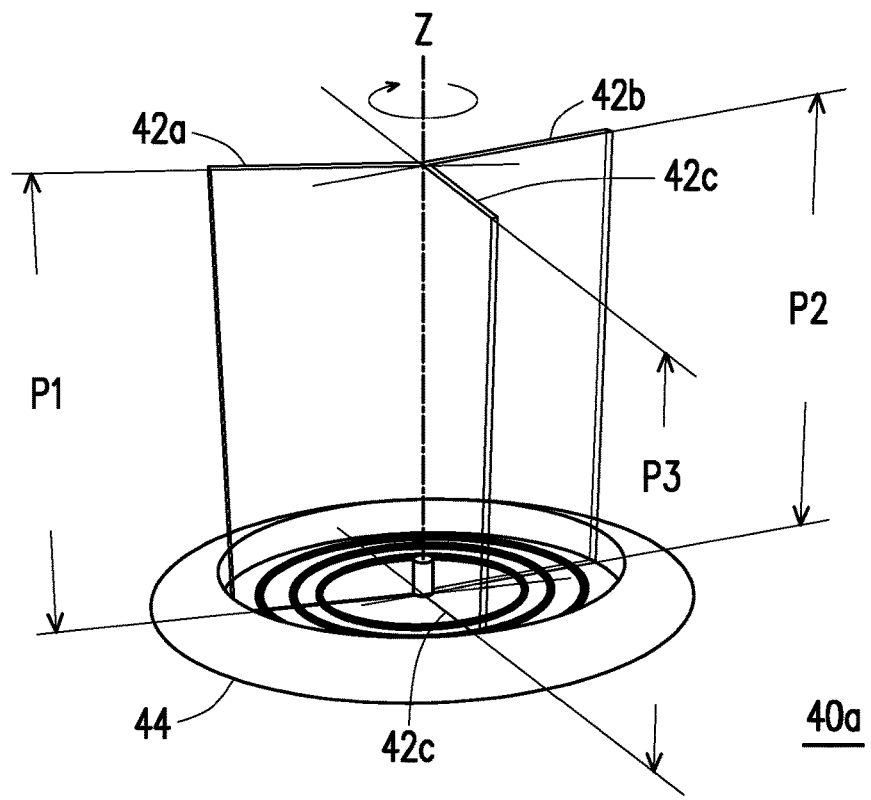
FIG. 4A and FIG. 4B are configuration diagrams of a transparent display device of a space three-dimensional imaging apparatus illustrated according to an embodiment of the disclosure.
Figure 4B:
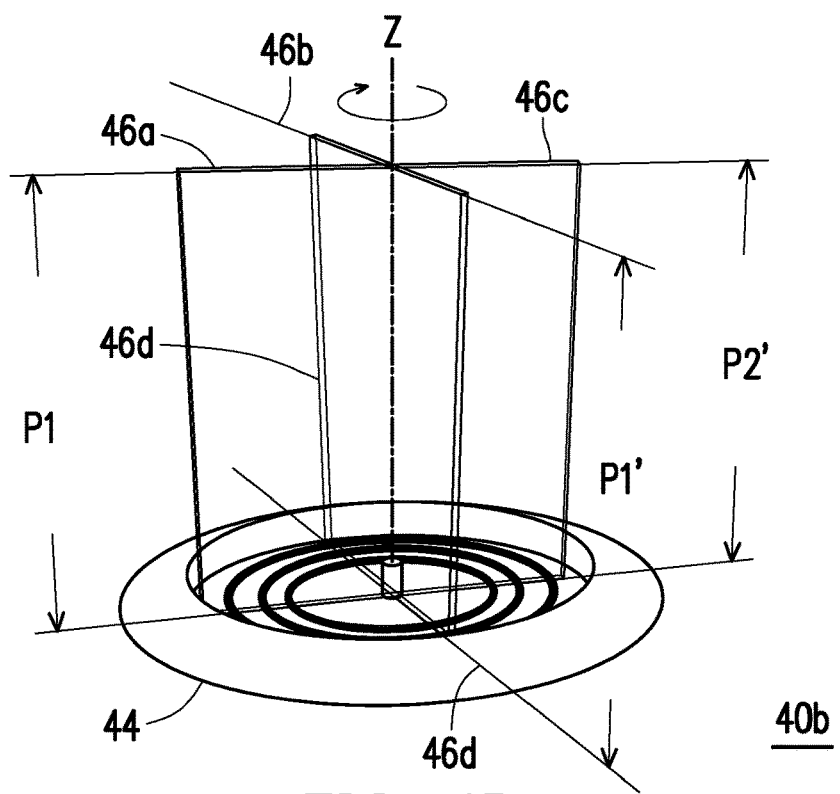

FIG. 4A and FIG. 4B are configuration diagrams of a transparent display device of a space three-dimensional imaging apparatus illustrated according to an embodiment of the disclosure. Referring to FIG. 4A, a space three-dimensional imaging apparatus 40a includes transparent displays 42a, 42b and 42c respectively configured on the display planes P1, P2 and P3 and a rotation motor 44 for driving the transparent displays 42a, 42b and 42c to rotate together along the axis Z. An included angle between the display planes P1, P2 and P3 is, for example, 120 degrees, but not limited thereto. Referring to FIG. 4B, a space three-dimensional imaging apparatus 40b includes transparent displays 46a and 46c configured on the display plane P1', transparent displays 46b and 46d configured on the display plane P2', and the rotation motor 44 for driving the transparent displays 46a, 46b, 46c and 46d to rotate together along the axis Z. Here, by using multiple transparent displays to form multiple display planes (which are not limited to planes or curved surfaces), the transparent displays can provide high-quality three-dimensional images when rotating at high speed.

Figure 5A:
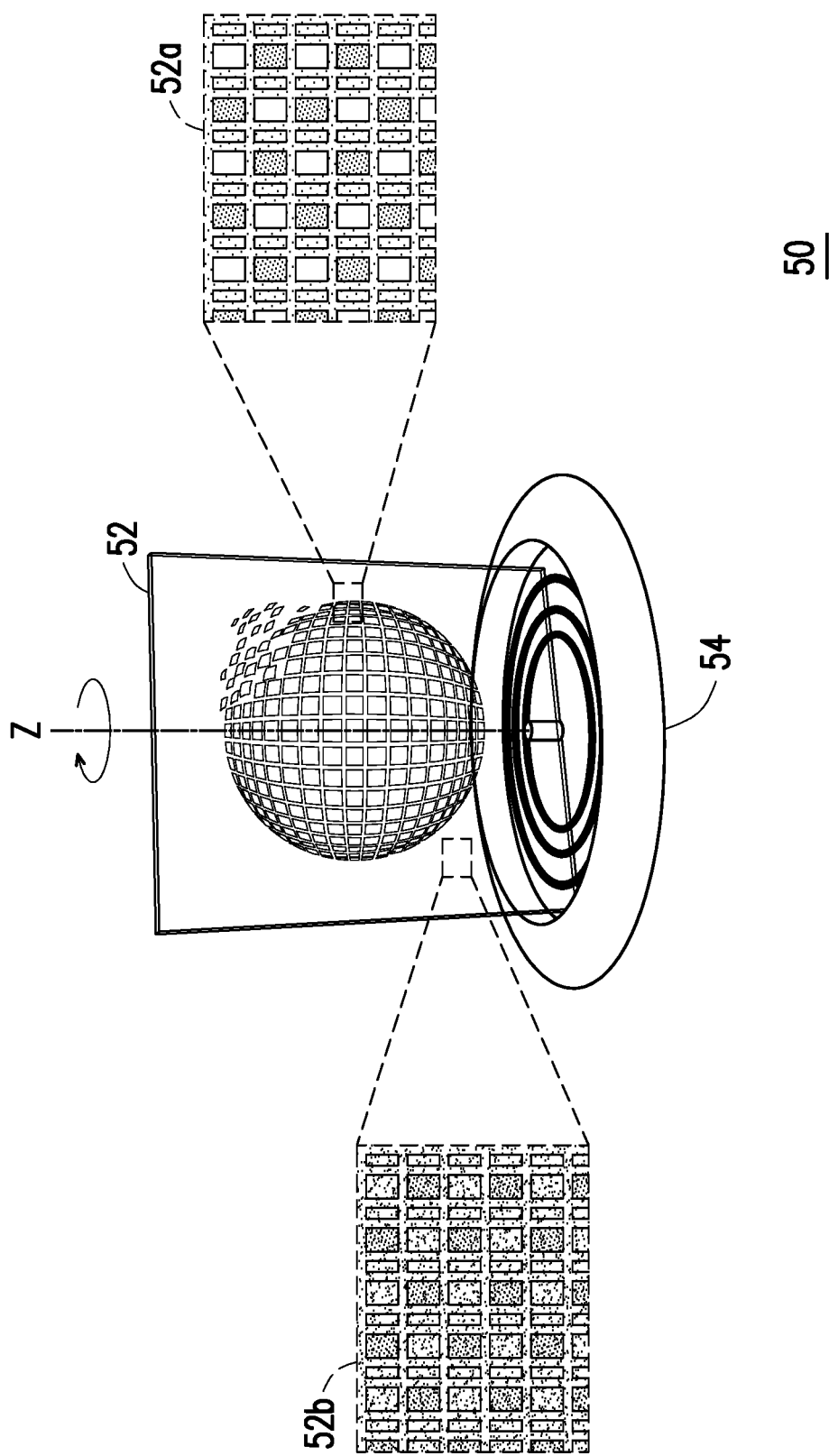
FIG. 5A is a configuration diagram of a transparent display device of a space three-dimensional imaging apparatus illustrated according to an embodiment of the disclosure.

FIG. 5A is a configuration diagram of a transparent display device of a space three-dimensional imaging apparatus illustrated according to an embodiment of the disclosure. Referring to FIG. 5A, a space three-dimensional imaging apparatus 50 includes a transparent display 52 having two display planes facing away from each other and a rotation motor 54 for driving the transparent display 52 to rotate along the axis Z. The transparent display 52, for example, displays three-dimensional images in different directions on the two display planes in a double-sided simultaneous multiplexing manner (e.g., a front three-dimensional image is displayed in a front display region 52a, and a back three-dimensional image is displayed in a back display region 52b). Accordingly, an image update frequency of the space three-dimensional imaging apparatus and a brightness of the displayed three-dimensional image may be improved. The transparent display 52 can achieve a double-sided display by, for example, a structure adopting a space dislocation method or a space superimposition method, but not limited thereto.

Figure 5B:
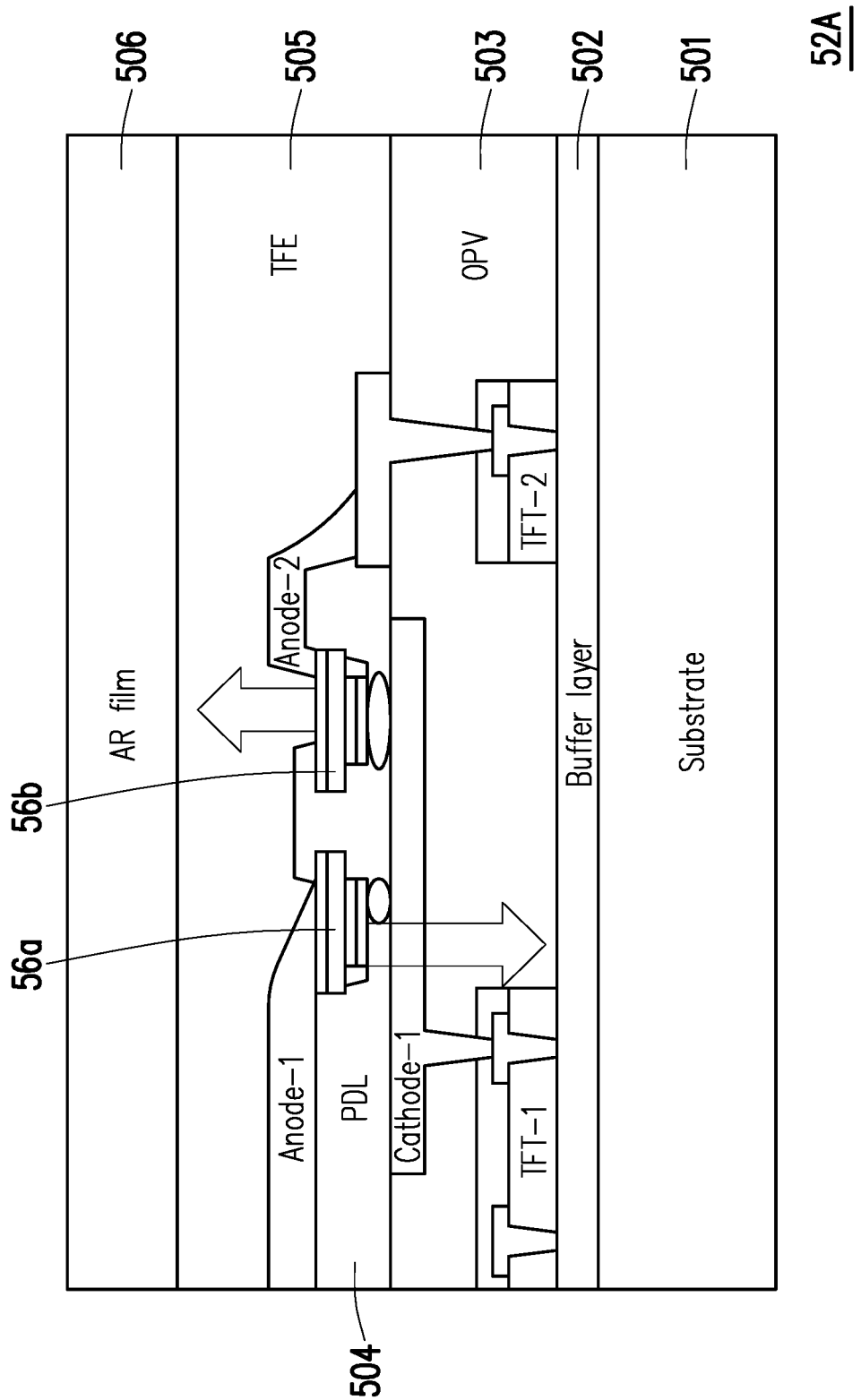
FIG. 5B and FIG. 5C are cross-sectional views of pixels of a transparent display device illustrated according to an embodiment of the disclosure.

FIG. 5B is a cross-sectional views of pixels of a transparent display device illustrated according to an embodiment of the disclosure. Referring to FIG. 5B, a pixel structure of a transparent display 52A adopts the space dislocation method. A buffer layer 502 may be disposed on a substrate 501. An organic passive layer (OPV) 503 is disposed on the buffer layer 502. The organic passive layer 503 is provided thereon with a pixel defining layer (PDL) 504, which includes light-emitting elements 56a and 56b arranged in parallel. A thin film encapsulation (TFE) layer 505 is fabricated on the light-emitting elements 56a and 56b to protect the light-emitting elements 56a and 56b. An anti-reflective (AR) film 506 may be covered on the thin film encapsulation layer 505. Each pixel of the transparent display 52A may have a dual driving circuit. The dual driving circuit may include electrodes Anode-1, Anode-2, Cathode-1 and thin film transistors (TFTs) TFT-1 and TFT-2, which are responsible for controlling the downward and upward light-emitting elements 56a and 56b, respectively. In addition, the transparent display 52A uses, for example, the electrode Cathode-1 made of an opaque metal to control the direction of light transmission, so as to achieve the purpose of single-side light emission.

Figure 5C:
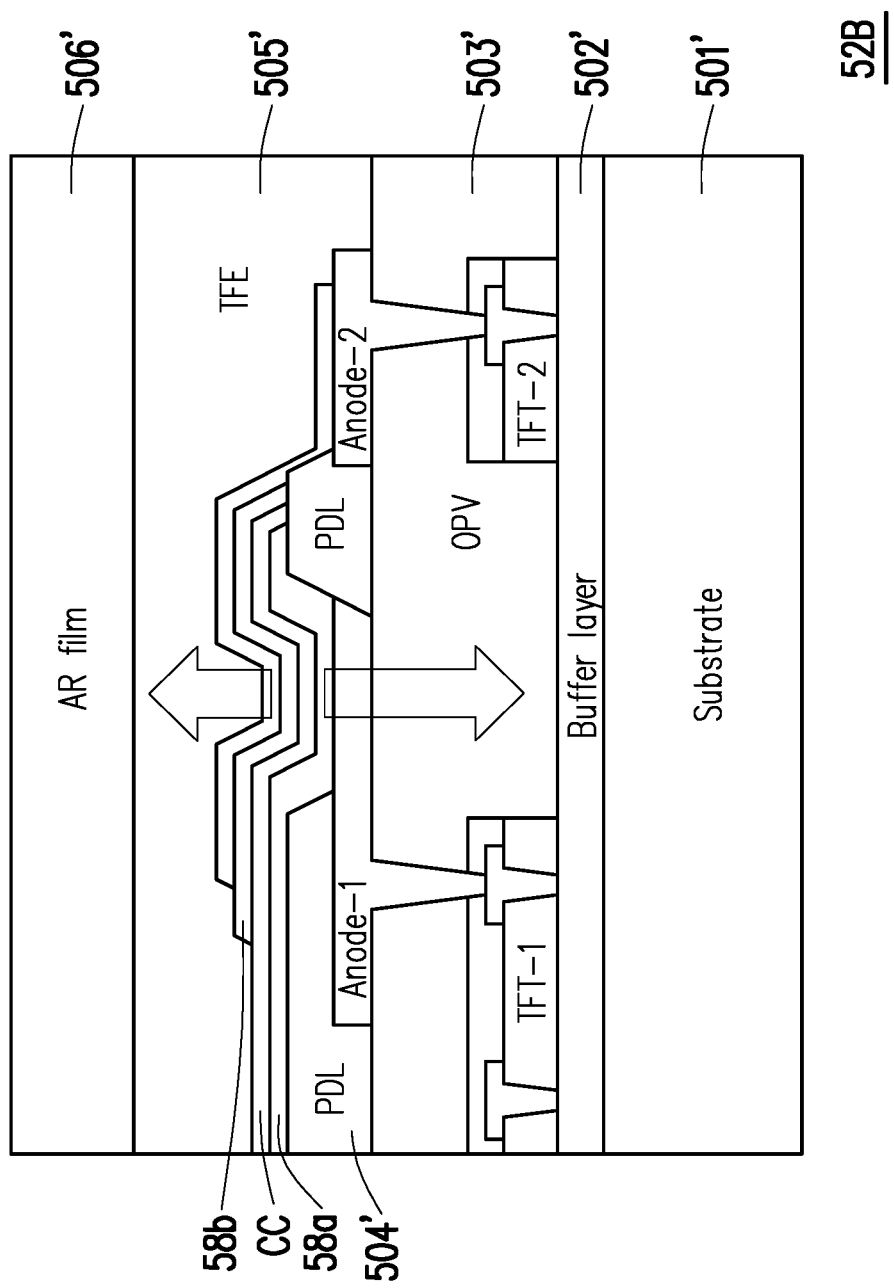

FIG. 5C is a cross-sectional views of pixels of a transparent display device illustrated according to an embodiment of the disclosure. Referring to FIG. 5B, a pixel structure of a transparent display 52B adopts the space superimposition method. A buffer layer 502' may be disposed on a substrate 501'. An organic passive layer 503' is disposed on the buffer layer 502'. The organic passive layer 503' is provided thereon with a pixel defining layer 504', which includes light-emitting elements 58a and 58b superimposed to each other. A thin film encapsulation layer 505' is fabricated on the light-emitting elements 58a and 58b to protect the light-emitting elements 58a and 58b. An anti-reflective film 506' may be covered on the thin film encapsulation layer 505'. Each pixel of the transparent display 52B may have a dual driving circuit. The dual driving circuit may include electrodes Anode-1 and Anode-2, a common electrode CC and thin film transistors TFT-1 and TFT-2, which are responsible for controlling the downward and upward light-emitting elements 58a and 58b, respectively. Moreover, the transparent display 52B uses, for example, the common electrode CC (which is highly reflective and disposed between the light-emitting elements 58a and 58b) to ensure that the upper and lower light does not interfere with each other, so as to achieve the purpose of double-sided display driving.

In some embodiments, the transparent display device 12 includes, for example, at least one transparent projection screen made of a luminous body or a scattering body and at least one projection device. The at least one transparent projection screens is respectively configured on at least one display plane, for example. When the transparent projection screen is made of a luminous body, the projection device, for example, projects the cutting images onto each display plane with light of a specific wavelength, so as to excite the luminous body on the transparent projection screen to display the cutting images. For example, the projection device can illuminate the transparent projection screen with blue light so that the luminous body therein is excited to emit green light. When the transparent projection screen is made of the scattering body, the projection device, for example, projects the cutting images onto the transparent projection screen of each display plane, so as to display the cutting images through a scattering of the scattering body on the transparent projection screen.

Figure 6A:
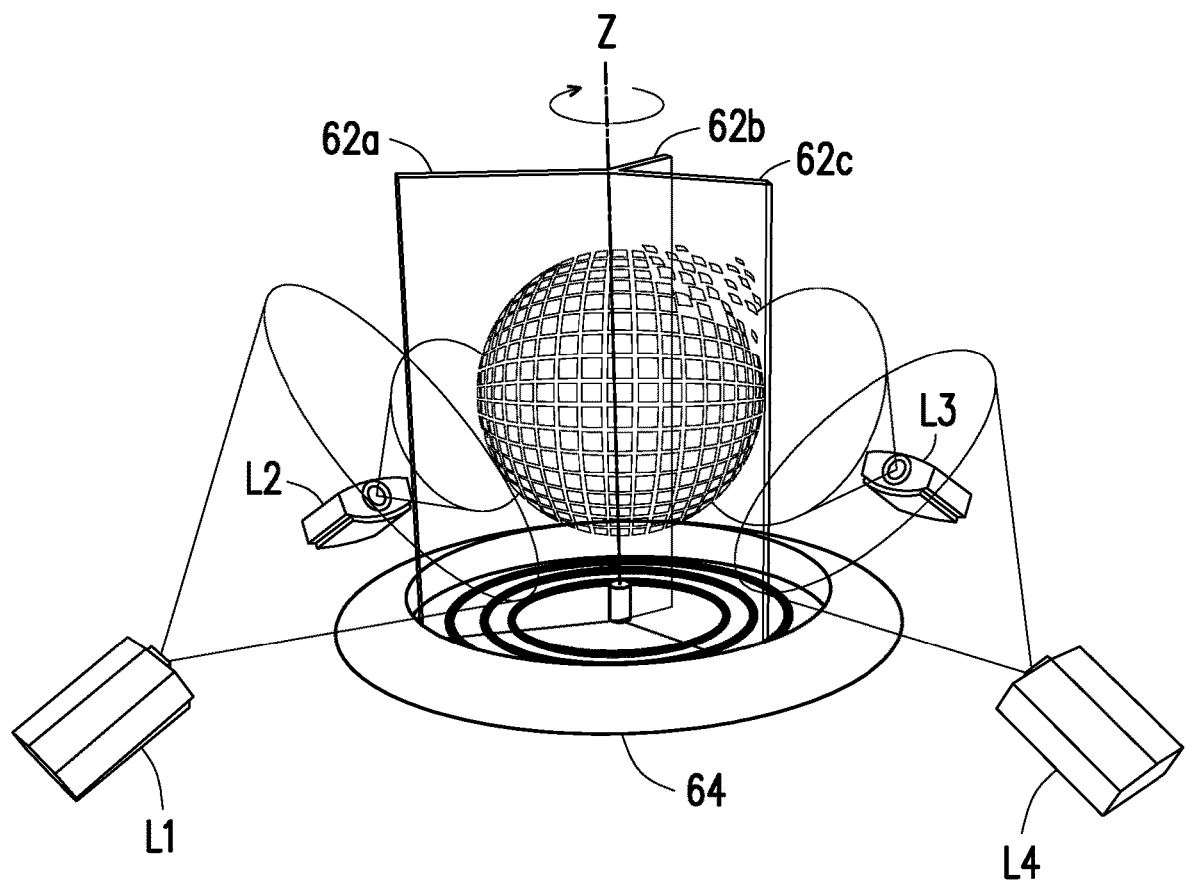
FIG. 6A and FIG. 6B are a side view and a top view of a transparent display device of a space three-dimensional imaging apparatus illustrated according to an embodiment of the disclosure.
Figure 6B:
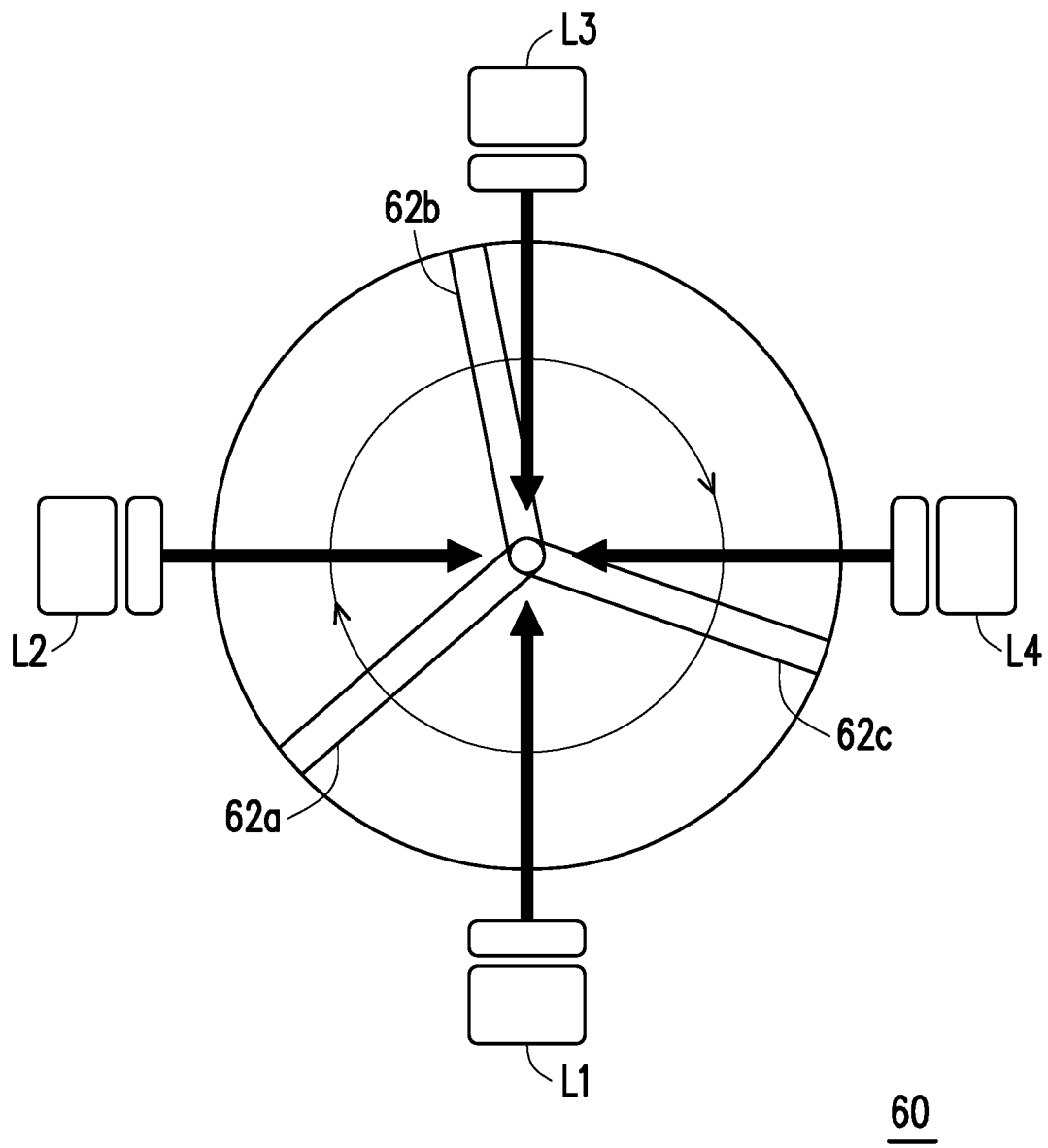

For instance, FIG. 6A and FIG. 6B are a side view and a top view of a transparent display device of a space three-dimensional imaging apparatus illustrated according to an embodiment of the disclosure. Referring to FIG. 6A and FIG. 6B together, a space three-dimensional imaging apparatus 60 includes three transparent projection screens 62a, 62b and 62c (which are provided with an included angle of 120 degrees between each other and coaxial) and a rotation motor 64 for driving the transparent projection screens 62a, 62b and 62c to rotate along the axis Z. In addition, the space three-dimensional imaging apparatus 60 further includes four projectors L1 to L4 configured to face toward the axis Z. The space three-dimensional imaging apparatus 60, for example, uses a spatial multitasking tween projection algorithm to calculate the cutting images adapted to be projected by each of the projectors L1 to L4 on the transparent projection screens 62a, 62b and 62c at different positions, and controls the projectors L1 to L4 to synchronously project the cutting images corresponding to current positions of the transparent projection screens 62a, 62b and 62c during the rotation of the transparent projection screens 62a, 62b and 62c, so as to display a three-dimensional image. By using multiple projectors L1 to L4 to simultaneously project the cutting images calculated by the spatial multitasking tween projection algorithm onto the transparent projection screens 62a, 62b and 62c from multiple angles, a resolution, a brightness, a display frequency and a response speed of the transparent display device of the space three-dimensional imaging apparatus 60 may be further improved.

In the foregoing embodiments, according to the transparent display device and the configuration of the display plane, the space three-dimensional imaging apparatus converts the three-dimensional virtual image into two-dimensional cutting images to be displayed on the transparent display device. For the transparent display, the image displayed by pixels of inner and outer circles rotating at the same angular velocity may have a difference in optical integrals. That is, under the same angular velocity rotation, optical integral of the pixel of the inner circle is higher, and optical integral of the pixel of the outer circle is lower. When accumulated optical integral of each pixel increases, optical integrals of adjacent pixels will overlap and cause afterimage. In this regard, the embodiment of the disclosure adopts measures like changing a pixel layout, adjusting a display driving and correcting display image data to adjust a display luminous effect, and compensate or correct afterimage and optimize a three-dimensional imaging quality.

In the embodiment of changing the pixel layout, for example, multiple display regions may be divided for the transparent display, and the pixel layout of the display region may be determined according to a distance between each display region and the axis for rotating the transparent display. For example, the display region farther from the axis may adopt a pixel layout with higher density, and the display region closer to the axis may adopt a pixel layout with lower density. In response to the change of the pixel layout, the image assigned to each display region is also adjusted accordingly. For example, the space three-dimensional imaging apparatus can sample the three-dimensional virtual image according to a pixel density of each display region to capture the cutting image adapted to be displayed on each display region, and drive the transparent display to display the captured cutting images. Accordingly, when the transparent display rotates at high speed, a display density and a luminous intensity per unit time of the outer circle (i.e., the display region farther from the axis) are relatively enhanced, and a display density and a luminous intensity per unit time of the inner circle (i.e., the display region closer to the axis) are relatively weakened. Accordingly, optical integrals of the pixels in the inner and outer circles become the same so that a consistent three-dimensional display effect may be presented.

In the embodiment of adjusting the display driving, for example, a driving voltage of each pixel in the pixels of the transparent display may be adjusted according to a distance between each pixel and the axis, and then the transparent display may be driven to display the cutting images. In this embodiment, by adjusting the driving voltages of the pixels in the inner and outer circles of the transparent display, a light-emitting effect of the pixels of the outer circle may be enhanced. Accordingly, optical integrals of the pixels in the inner and outer circles become the same so that a consistent three-dimensional display effect may be presented.

In the embodiment of correcting the display image data, for example, a light intensity of each pixel of the tangent image may be adjusted according to a distance between each pixel in the multiple pixels of the cutting image and the axis so that the transparent display device can display the adjusted cutting images. For example, brightness values of pixels located in the outer circle in the cutting image may be increased, and brightness values of pixels located in the inner circle in the cutting image may be reduced. In this way, when the transparent display device displays the adjusted cutting images under high-speed rotation, optical integrals of the pixels in the inner and outer circles may be the same to present a consistent three-dimensional display effect.

Figure 7A:
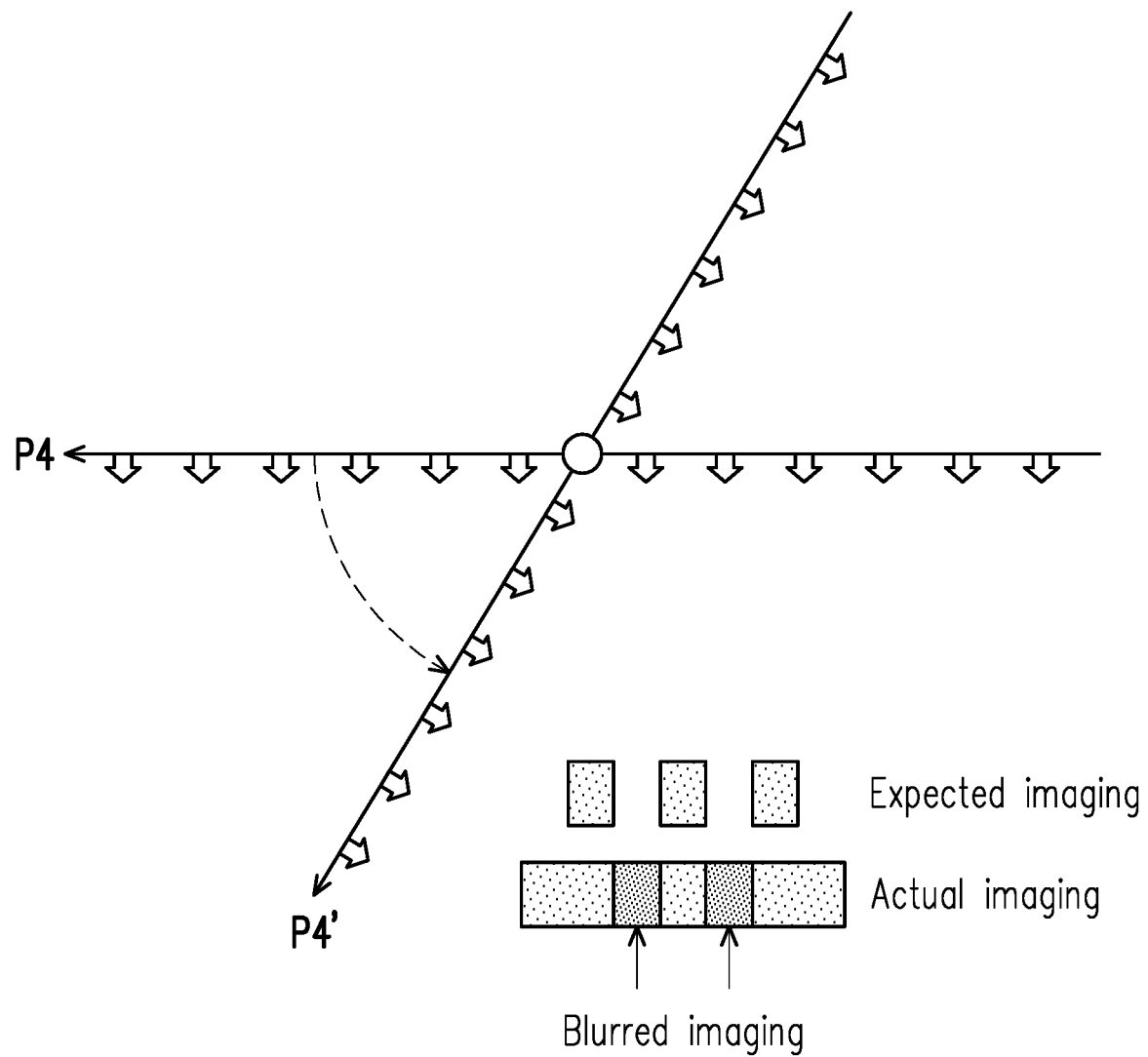
FIG. 7A and FIG. 7B are schematic diagrams of a method for correcting rotation image data illustrated according to an embodiment of the disclosure.
Figure 7B:
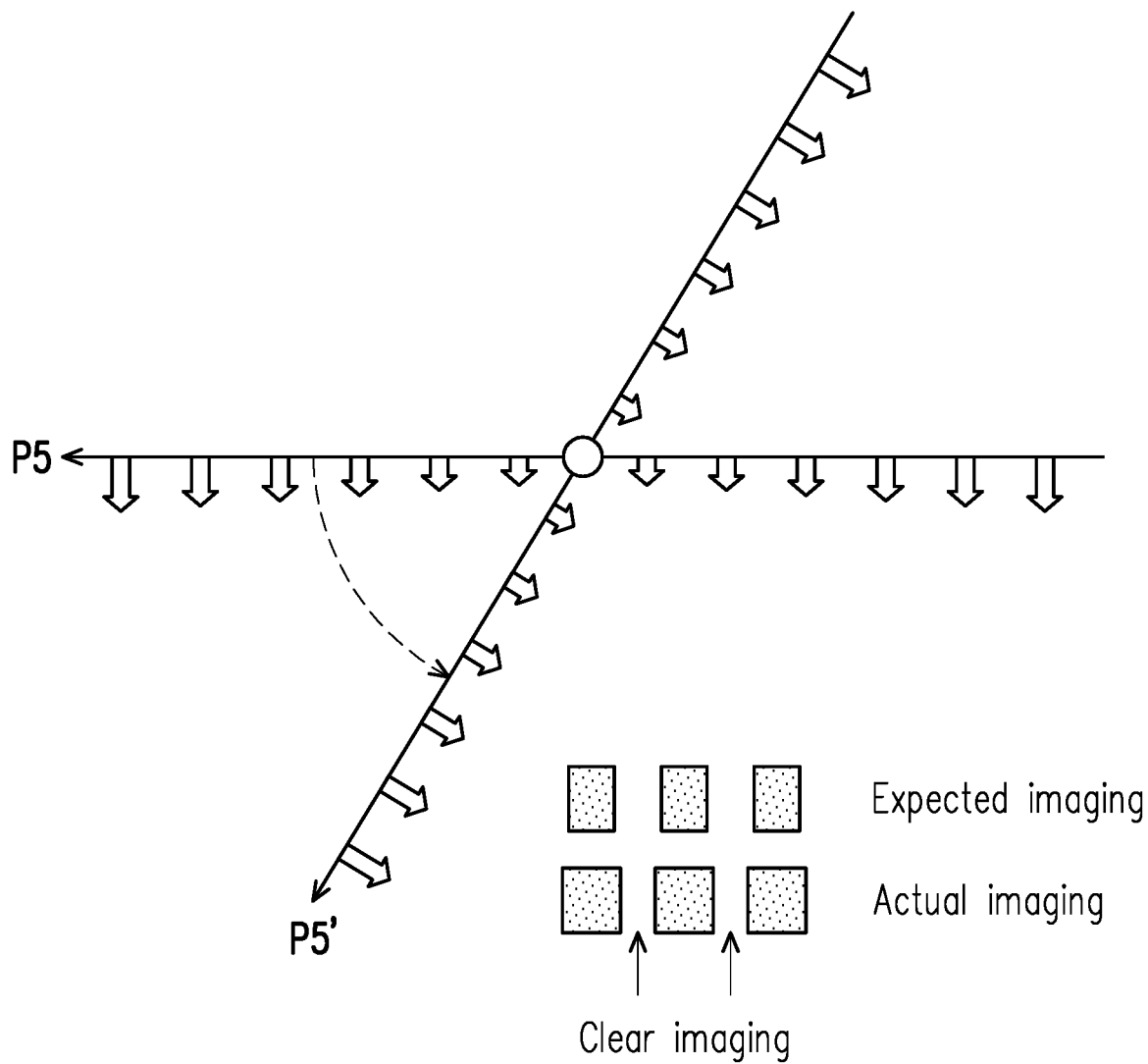

For instance, FIG. 7A and FIG. 7B are schematic diagrams of a method for correcting rotation image data illustrated according to an embodiment of the disclosure. Referring to FIG. 7A, it is assumed that a three-dimensional image is displayed by each pixel of the transparent display on a display plane P4 with the same brightness. When the transparent display rotates to a display plane P4', due to accumulation of optical integrals, optical integrals of adjacent pixels (especially the pixels of the inner circle) will overlap in actual imaging, and the overlapping part will cause the problem of blurred imaging. In this regard, in FIG. 7B, by adjusting a brightness of the pixels of the inner and outer circles of the transparent display so that the brightness of the pixels of the outer circle is relatively enhanced and the brightness of the pixels of the inner circle is relatively weakened, when the transparent display rotates from a display plane P5 to a display plane P5', actual imaging of each pixel will be expanded due to accumulation of optical integrals (relative to expected imaging) but will not overlap with each other. Accordingly, the three-dimensional image with clear imaging may be generated.

The space three-dimensional imaging apparatus and method of the embodiment of the disclosure uses a single or multiple transparent displays to form a single or multiple display planes, and combines the image calculation technology to correct or compensate for the problem of overlapping afterimage or blurred imaging caused by displaying in high speed rotation. As a result, a brightness, a contrast or a image update frequency of the three-dimensional image may be improved to achieve a full viewing angle and a high-quality floating three-dimensional image that can be watched by multiple people at the same time.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:

1. A space three-dimensional imaging apparatus, comprising:
   a transparent display device, having at least one display plane;
   a rotation motor, driving the transparent display device to rotate along an axis;
   a processor, coupled to the transparent display device and the rotation motor, and configured to:
      retrieve a three-dimensional virtual image;
      cut a plurality of cutting images adapted to be displayed at a plurality of locations of each of the at least one display plane after a rotation from the three-dimensional virtual image according to a configuration of the at least one display plane and a driving of the rotation motor, wherein the cutting images comprising images that build up the three-dimensional virtual image at different angles according to a rotation position of the rotation motor; and
      calculate a current location of each of the at least one display plane during the rotation according to the driving of the rotation motor to control the transparent display device to display the cutting image corresponding to the current location on each of the at least one display plane, wherein the transparent display device comprises:
   at least one transparent projection screen respectively configured on the at least one display plane; and
   at least one projection device, projecting the cutting images onto the at least one transparent projection screen on each of the at least one display plane to display the cutting images,
   wherein the at least one transparent projection screen comprising a plurality of screens,
   wherein the at least one projection device comprising a plurality of projectors,
   wherein the processor is further configured to:
      use a spatial multitasking tween projection algorithm to calculate the cutting images adapted to be projected by the plurality of projectors on the plurality of screens; and
      control the plurality of projectors to synchronously project the cutting images corresponding to positions of the plurality of screens during the rotation so as to display the three-dimensional virtual image, wherein the transparent display device comprises:
a transparent display having a plurality of display regions, wherein a pixel density of the display region farther from the axis is higher than a pixel density of the display region closer to the axis,
wherein the processor samples the three-dimensional virtual image according to the pixel density of each of the display regions to capture the cutting image adapted to be displayed on each of the display regions, and drives the transparent display to display the captured cutting images.

2. The space three-dimensional imaging apparatus of claim 1, wherein the transparent display device is a transparent display having two display planes facing away from each other.

3. The space three-dimensional imaging apparatus of claim 1, wherein the transparent display device comprises:
a plurality of transparent displays, respectively configured in a plurality of display regions of the same display plane, and configured to display the cutting images of the plurality of display regions.

4. The space three-dimensional imaging apparatus of claim 1, wherein
the at least one transparent projection screen is made of a luminous body or a scattering body; and
the at least one projection device projects the cutting images onto the at least one transparent projection screen on each of the at least one display plane to display the cutting images on the at least one transparent projection screen with light of a specific wavelength to excite the luminous body or through a scattering of the scattering body.

5. The space three-dimensional imaging apparatus of claim 1, wherein the transparent display device comprises:
a transparent display that displays the cutting images on a first display region and a second display region in a double-sided simultaneous multiplexing manner, wherein a front image is displayed on the first display region and a back image is displayed on the second display region.

6. The space three-dimensional imaging apparatus of claim 1, wherein the transparent display device comprises:
a plurality of transparent displays, respectively configured in a plurality of display planes that rotate together along the axis, and configured to display the cutting images of the plurality of display planes.

7. The space three-dimensional imaging apparatus of claim 1, wherein according to a distance between each pixel in a plurality of pixels of the transparent display device and the axis, the processor adjusts a driving voltage of the pixels, and drives the transparent display device to display the cutting images.

8. The space three-dimensional imaging apparatus of claim 1, wherein according to a distance between each pixel in a plurality of pixels of the cutting images and the axis, the processor adjusts a light intensity of each of the pixels of the cutting images, and drives the transparent display device to display the adjusted cutting images.

9. A space three-dimensional imaging method adapted to a transparent display device having at least one display plane, and a space three-dimensional imaging apparatus having a rotation motor configured to drive the transparent display device to rotate along an axis and a processor, the method comprising steps of:

retrieving a three-dimensional virtual image,
cutting a plurality of cutting images adapted to be displayed at a plurality of locations of each of the at least one display plane after a rotation from the three-dimensional virtual image according to a configuration of the at least one display plane and a driving of the rotation motor, wherein the cutting images comprising images that build up the three-dimensional virtual image at different angles according to a rotation position of the rotation motor; and
calculating a current location of each of the at least one display plane during the rotation according to the driving of the rotation motor to control the transparent display device to display the cutting image corresponding to the current location on each of the at least one display plane, wherein the transparent display device comprises:
at least one transparent projection screen respectively configured on the at least one display plane; and
at least one projection device, projecting the cutting images onto the at least one transparent projection screen on each of the at least one display plane to display the cutting images,
wherein the at least one transparent projection screen comprising a plurality of screens,
wherein the at least one projection device comprising a plurality of projectors,
wherein the method further comprising:
using a spatial multitasking tween projection algorithm to calculate the cutting images adapted to be projected by the plurality of projectors on the plurality of screens; and
controlling the plurality of projectors to synchronously project the cutting images corresponding to positions of the plurality of screens during the rotation so as to display the three-dimensional virtual image,
wherein the transparent display device comprises a transparent display having a plurality of display regions, wherein a pixel density of the display region farther from the axis is higher than a pixel density of the display region closer to the axis,
wherein the step of cutting the cutting images adapted to be displayed at the locations of each of the at least one display plane after the rotation from the three-dimensional virtual image further comprises:
sampling the three-dimensional virtual image according to the pixel density of each of the display regions to capture the cutting image adapted to be displayed on each of the display regions, and driving the transparent display to display the captured cutting images.

10. The space three-dimensional imaging method of claim 9, wherein the transparent display device is a transparent display having two display planes facing away from each other, and the step of controlling the transparent display device to display the cutting images comprises:
controlling the transparent display to display the cutting images on the two display planes.

11. The space three-dimensional imaging method of claim 9, wherein the transparent display device comprises a plurality of transparent displays respectively configured in a plurality of display regions of the same display plane, and the step of controlling the transparent display device to display the cutting images comprises:
controlling the plurality of transparent displays to display the cutting images of the plurality of display regions.

12. The space three-dimensional imaging method of claim 9, wherein the at least one transparent projection screen is made of a luminous body or a scattering body, and the step of controlling the at least one transparent display device to display the cutting images comprises:

controlling the at least one projection device to project the cutting images onto the at least one transparent projection screen on each of the at least one display plane to display the cutting images on the at least one transparent projection screen with light of a specific wavelength to excite the luminous body or through a scattering of the scattering body.

13. The space three-dimensional imaging method of claim 9, wherein the transparent display device comprises a transparent display that displays the cutting images on a first display region and a second display region in a double-sided simultaneous multiplexing manner, wherein a front image is displayed on the first display region and a back image is displayed on the second display region.

14. The space three-dimensional imaging method of claim 9, wherein the transparent display device comprises a plurality of transparent displays respectively configured on a plurality of display planes that rotate together along the axis, and the step of controlling the transparent display device to display the cutting images comprises:

controlling the plurality of transparent displays to display the cutting images of the plurality of display planes.

15. The space three-dimensional imaging method of claim 9, wherein the step of controlling the transparent display device to display the cutting images comprises:

according to a distance between each pixel in a plurality of pixels of the transparent display device and the axis, adjusting a driving voltage of the pixels, and driving the transparent display device to display the cutting images.

16. The space three-dimensional imaging method of claim 9, wherein the step of controlling the transparent display device to display the cutting images comprises:

according to a distance between each pixel in a plurality of pixels of the cutting images and the axis, adjusting a light intensity of each of the pixels of the cutting images, and driving the transparent display device to display the adjusted cutting images.

* * * * *